United States Patent
Puretic

[15] 3,643,921
[45] Feb. 22, 1972

[54] POWER BLOCK

[72] Inventor: Mario J. Puretic, 259 6th Ave. N., Monte Cristo Isle, Tierra Verde, Fla. 33715

[22] Filed: June 9, 1970

[21] Appl. No.: 66,598

Related U.S. Application Data

[63] Continuation of Ser. No. 715,926, Mar. 25, 1968, abandoned.

[52] U.S. Cl. .............................. 254/138, 74/230.24, 43/8, 254/135, 254/190, 254/192
[51] Int. Cl. ........................................................ A01k 73/06
[58] Field of Search ................... 254/135, 137, 138, 190, 192; 43/8; 74/230.24, 230.17

[56] References Cited

UNITED STATES PATENTS

| | | | |
|---|---|---|---|
| 473,254 | 4/1892 | Dodge | 74/230.74 |
| 2,733,531 | 2/1956 | Puretic | 254/138 |
| 2,827,795 | 3/1958 | Caballeros | 74/230.24 |

FOREIGN PATENTS OR APPLICATIONS

| | | | |
|---|---|---|---|
| 670,661 | 1/1939 | Germany | 74/230.24 |

Primary Examiner—Harvey C. Hornsby
Attorney—Fulwider, Patton, Rieber, Lee & Utecht

[57] ABSTRACT

An improved power block for pulling a fishing net from a submerged expanded fish-catching position onto the deck of a fishing boat in a gathered-together position. The improved power block includes a spool having a pair of outwardly tapering spool halves, the proximate sides of which define a generally V-shaped gap that frictionally receives the fishing net. The spool halves are relatively tiltable for varying the angle of the gap to thereby accommodate varying bulks of the net passing through the gap and also varying friction requirements. The improved power block may either be suspended above the deck of the fishing boat or alternatively may be mounted on such deck.

12 Claims, 7 Drawing Figures

PATENTED FEB 22 1972 3,643,921
SHEET 1 OF 2
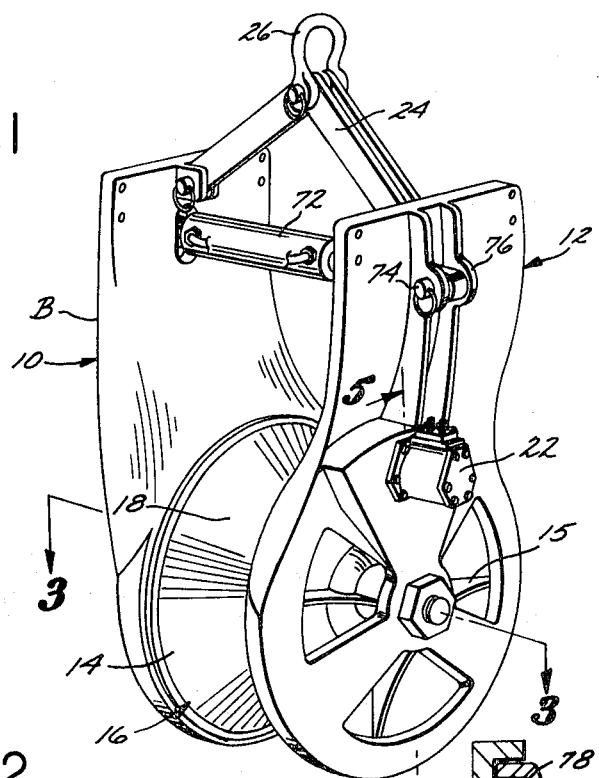
FIG. 1
FIG. 2
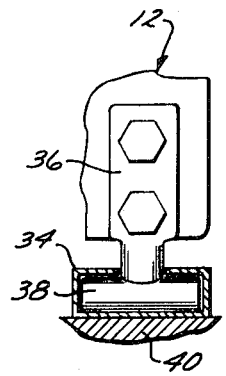
FIG. 4
FIG. 3
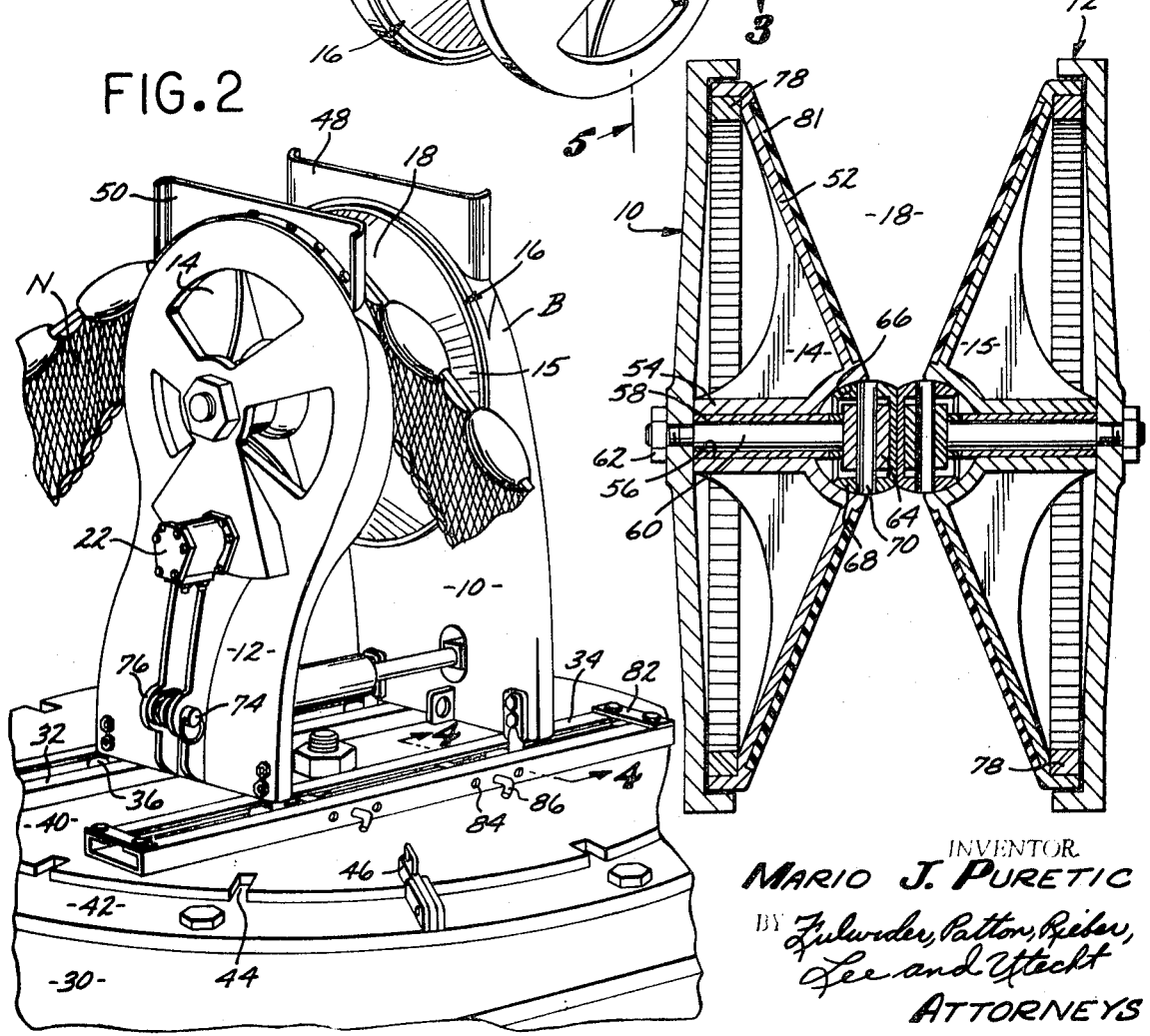
INVENTOR.
MARIO J. PURETIC
BY Fulwider, Patton, Rieber,
Lee and Utecht
ATTORNEYS

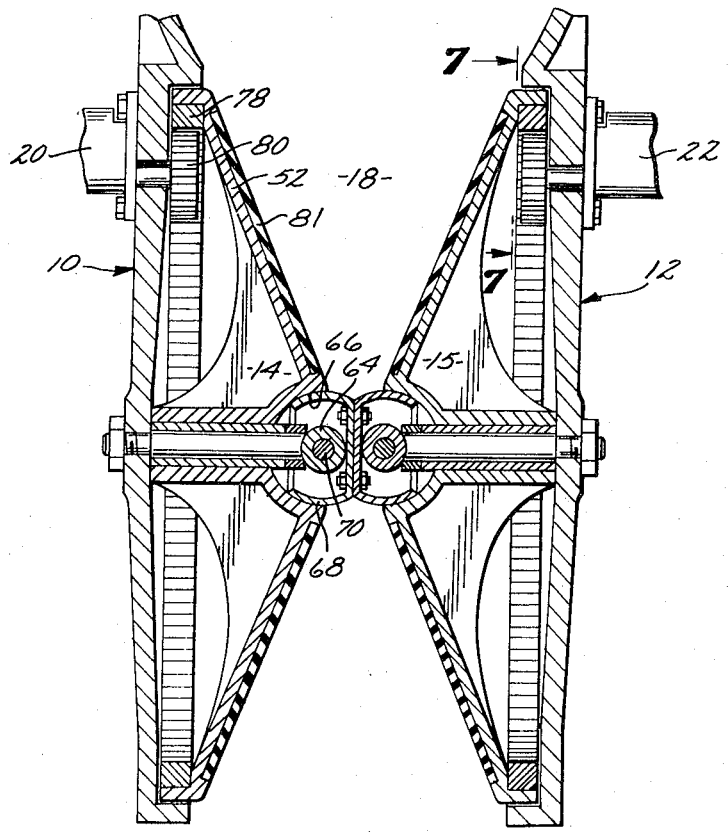
FIG. 5
FIG. 6
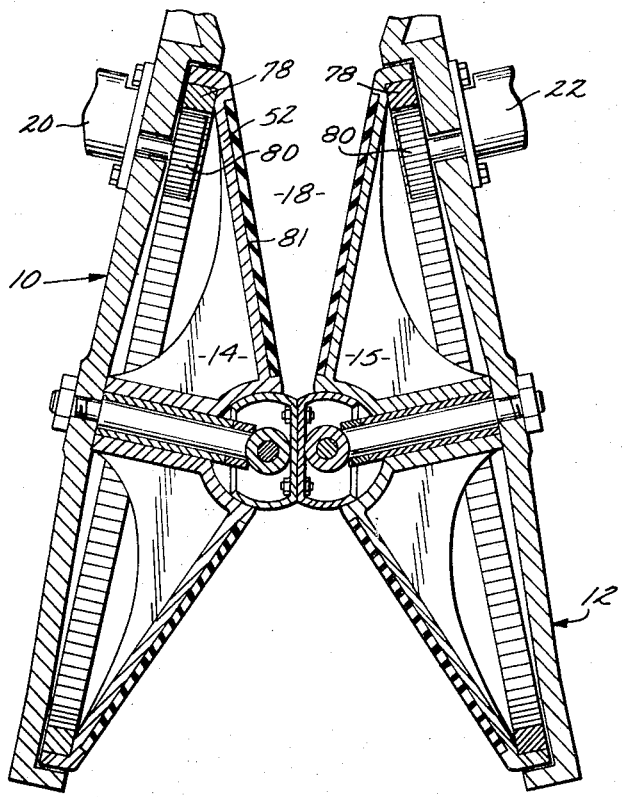
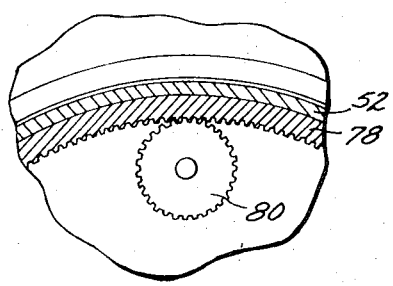
FIG. 7

POWER BLOCK

This application is a continuation of 715,926, filed Mar. 25, 1968, and now abandoned.

BACKGROUND OF THE INVENTION

1. Field of Invention

The present invention relates generally to the field of commercial fishing and more particularly to an improved power block adapted to efficiently retrieve a fishing net from a submerged and expanded fish-catching position onto the deck of a fishing boat in a gathered-together position.

2. Description of Prior Art

It is known to provide fishing boats with a so-called "power block" for raising a purse seine net from a submerged, expanded fish-catching position to an elevated position above the deck of a boat from where the net is subsequently lowered as a moving column that can be stacked in a desired configuration on the deck. A power block of this type is disclosed in my U.S. Pat. No. 2,733,531 issued Feb. 7, 1956. It is also known to retrieve a submerged purse seine net from a submerged fish-gathering position onto the deck of a fishing boat in a gathered-together position by means of a pair of adjacently disposed, generally upwardly extending fair-lead members, the space between such fair-lead members receiving the fishing net. Such fair-lead members are concurrently power rotated in opposite directions. This type of apparatus is disclosed in my U.S. Pat. No. 3,069,799, issued Dec. 25, 1962.

SUMMARY OF INVENTION

It is the major object of the present invention to provide an improved power block of the type shown in my aforementioned U.S. Pat. No. 2,733,531, such improved power block accommodating the wide variety of nets and fishing boats in use throughout the world.

It is another object of the present invention to provide an improved power block which is adapted to retrieve nets which are bulky in their middle portion and comparatively thin towards their outer portions or wings.

A further object of the present invention is to provide an improved power block which is capable of applying a variable gripping effect upon a fish net being retrieved.

The improved power block of the present invention effects the foregoing objects and advantages by the utilization of a power-operated spool which includes a pair of outwardly tapering spool halves, the proximate sides of which define a generally V-shaped gap that frictionally receives the net, with the spool halves being relatively tiltable for varying the angle of said gap.

It is yet a further object of the present invention to provide an improved power block of the aforedescribed nature which may either be suspended above the deck of the fishing boat or alternatively may be mounted upon the deck thereof.

Other objects and advantages of the present invention will become apparent from the following detailed description, when taken in conjunction with the appended drawings.

DESCRIPTION OF THE DRAWINGS

FIG. 1 is a perspective view showing a preferred form of improved power block embodying the present invention arranged to be suspended above the deck of a fishing boat;

FIG. 2 is a perspective view of said power block shown mounted upon the deck of a fishing boat;

FIG. 3 is a horizontal sectional view taken in enlarged scale along line 3—3 of FIG. 1;

FIG. 4 is a vertical sectional view taken in further enlarged scale along line 4—4 of FIG. 2;

FIGS. 5 and 6 are vertical central sectional views of said block showing the tilting action thereof; and FIG. 7 is a fragmentary vertical sectional view taken along line 7—7 of FIG. 5.

DESCRIPTION OF THE PREFERRED EMBODIMENT

Referring to the drawings, there is shown a preferred form of improved power block embodying the present invention. The improved power block B includes a two-piece frame, the two halves thereof being generally designated 10 and 12, respectively. The frame halves 10 and 12 respectively support the two halves 14 and 15 of a sheave, generally designated 16, with the proximate sides of such sheave halves 14 and 15 defining a generally V-shaped gap 18 that receives a fishing net N (FIG. 2) which is to be retrieved, such gap 18 best being shown in FIGS. 3, 5 and 6. The frame halves 10 and 12 each carry a conventional hydraulic motor 20 and 22, respectively, that rotate the sheave halves 14 and 15. It should be noted, however, that a single hydraulic motor may be employed rather than two such motors.

It is a particular feature of the present invention that the two sheave halves 14 and 15 may be tilted relative to one another so as to vary the angle of the gap 18 to thereby accommodate variations in the bulk of the portion of the net passing through the gap and also to accommodate for varying friction requirements during a net-retrieving operation.

More particularly, the frame halves 10 and 12 are mirror images of one another and each is of rigid metallic construction. Referring to FIG. 1, the improved power block B is shown provided with a hinged yoke 24 that extends between the upper midportions of the frame halves 10 and 12, the pivoted midportion of such yoke being provided with a hanging clevis 26. The clevis 26 is adapted to be connected to a suitable hoisting line or the like (not shown) in the manner employed with conventional power blocks. The lower portion of the frame halves 10 and 12 are generally arcuate in construction to complement the outer diameter of the sheave halves 14 and 15. Above these sheave halves inwardly facing surfaces of the frame halves 10 and 12 are configured so as to define guide means that initiate compaction of the net N within the gap 18 defined between the sheave halves.

Referring now to FIG. 2, the power block B is shown mounted in an inverted position relative to FIG. 1 upon the deck 30 of a fishing boat. In this inverted position, the lower ends of the frame halves 10 and 12 are supported upon a pair of horizontal rails 32 and 34 by means of like slider blocks 36 mounted at the corners of such frame halves. A detail of one of such slider blocks 36 is shown in FIG. 4. Referring thereto it will be observed that the lower portion of the slider blocks are each formed with horizontal pegs 38 slidably disposed within the rails 32 and 34. The rails 32 and 34 are affixed to an annular mounting plate 40 which is rotatably supported upon a turntable 42, the latter being fixed to the boat deck 30. The periphery of the mounting plate 40 is formed with a plurality of radially extending slots 44 that selectively receive a locking finger 46 carried by the turntable 42 to lock the mounting plate 40 at any desired angle relative to the turntable. With continued reference to FIG. 2, it should be noted that the upper portion of the frame halves 10 and 12 are provided with like guide plates 48 and 50 that initiate compaction of the net N within the gap 18 between the sheave halves 14 and 15.

Referring now to FIGS. 3, 5 and 6, the sheave halves 14 and 15 each include webs 52 which taper outwardly from their center portions, with the lower ends of such webs being integral with a hub 54. Each hub 54 is formed with a bore 56 that receives a bearing sleeve 58. The bearing sleeves 58 in turn receive stub shafts 60. The outer ends of such stub shafts are threaded and rigidly affixed to the frame halves 10 and 12 by nuts 62. The inner or proximate ends of the stub shafts are provided with horizontal sleeves 64.

The proximate sides of the central portion of hubs 54 define sockets 66. The inner surfaces of these sockets slidably receive ball elements 68. These ball elements 68 each rigidly support the outer ends of a horizontal pin 70, as shown particularly in FIG. 3. These pins 70 are rotatably carried by the sleeves 64. The aforedescribed arrangement permits the sheave halves 14 and 15 to undergo relative tilting movement in a vertical plane to thereby vary the angle of the gap 18, as indicated in FIGS. 5 and 6.

Referring again to FIG. 1, the angle of gap 18 is adjusted by means of a hydraulic cylinder and plunger unit 72 interposed between the upper portions of the frame halves 10 and 12, the outer ends of the cylinder and plunger unit 72 being pivotally connected to their respective frame halves by readily removable pivot pins 74 carried by complementary brackets 76 formed on the outer surfaces of the frame halves.

With reference to FIGS. 5, 6 and 7, the sheaves halves 14 and 15 include ring gears 78 supported on the outer portion of webs 52. The teeth of each of these ring gears 78 are meshed with the teeth of a pinion gear 80 keyed to the drive shaft of one of the hydraulic motors 20 and 22.

In the operation of the aforedescribed power block, when the block is mounted as shown in FIG. 1, the fishing net (not shown in FIG. 1) is introduced into the gap 18. Thereafter, the hydraulic motors 20 and 22 are actuated so as to rotate the sheave halves 14 and 15. As the latter rotate the net is frictionally gripped by the sheave so as to be pulled out of the water and onto the deck of the boat upon which the power block is mounted. If during such net-retrieving operation the bulk of the portion of the net in the gap 18 increases, the cylinder and plunger unit 72 is actuated to urge the top of the frame halves 10 and 12 apart. In this manner the angle of the net-receiving gap 18 is increased to accommodate the increased net bulk. Alternatively, should it be necessary to increase the magnitude of the friction being applied to the net, the hydraulic cylinder and plunger unit 72 will be actuated to draw the top of the frame halves 10 and 12 towards one another to thereby decrease the angle of gap 18.

It will be understood that operation of the cylinder and plunger unit 72 and of the hydraulic motors 20 and 22 is effected by means of suitable control valves (not shown) in a conventional manner. It should be further understood that the motors 20 and 22 may be operated at different speeds to drive one sheave half faster or slower than the other.

Preferably, the proximate surfaces of the sheave webs 52 are provided with a layer of rubber 81 so as to increase the coefficient of friction between the sheave halves and the net.

If it is desired to mount the improved power block on the present invention in the position of FIG. 2, the yoke 24 is removed and the frame halves 10 and 12 inverted, the slider blocks 36 first being secured to the corners of such frame halves. The slider blocks 36 are then slidably disposed within the rails 32 and 34. To restrain the slider blocks 36 relative to the rails the outer ends of the latter are provided with removable stops 82 while the intermediate portion thereof are formed with aligned bores 84 that selectively receive positioner rods 86. It should be noted that the guide plates 48 and 50 are secured in place prior to a net-retrieving operation. It should also be noted that the angle of the power block relative to the net can be set by means of the aforedescribed turntable indexing finger 46 or alternatively the power block may be left free to assume an angle generally facing the net if the indexing finger 46 is pivoted upwardly clear of the mounting plate slots 44.

Various modifications may be made with respect to the foregoing detailed description without departing from the spirit of the present invention.

I claim:

1. An improved power block for use in pulling a fish net from an expanded fish-catching position onto the deck of a fishing boat in a gathered-together position, comprising:

a frame;

a generally vertically extending sheave rotatably supported on said frame, said sheave including a pair of outwardly tapering sheave halves, the proximate sides of which define a generally V-shaped gap that frictionally receives said net;

means operatively associated with said frame to effect relative tilting movement of said sheave halves for varying the angle of said gap;

guide means on said frame that initiate compaction of said net within said gap;

and power means on said frame for rotating said sheave halves.

2. Apparatus as set forth in claim 1 wherein said frame includes two tiltable frame halves each carrying one of said sheave halves, with hinged connection means interconnecting the central portion of said sheave halves.

3. Apparatus as set forth in claim 1 wherein said frame may be suspended above said deck during its net-pulling operation or alternatively said frame may be inverted for mounting upon said deck.

4. Apparatus as set forth in claim 1 which further includes a turntable on said deck, a mounting plate rotatably carried by said turntable, and means on said mounting plate that support said frame.

5. Apparatus as set forth in claim 2 wherein fluid-operated means are interposed between said frame halves to effect said relative tilting movement.

6. Apparatus as set forth in claim 2 which further includes turntable means on said deck that receive said frame halves for movement towards and away from one another.

7. Apparatus as set forth in claim 5 which further includes turntable means on said deck that receive said frame halves for movement towards and away from one another.

8. An improved power block for use in pulling a fish net from an expanded fish-catching position onto the deck of a fishing boat in a gathered-together position, comprising:

a frame having a pair of generally vertically extending members;

a generally vertically extending sheave rotatably supported between the upper portion of said frame members, said sheave including a pair of outwardly tapering sheave halves, the proximate sides of which define a generally V-shaped gap that frictionally receives said net;

means operatively interposed between said frame members to urge their lower ends towards and away from one another to thereby effect relative tilting movement of said sheave halves for varying the angle of said gap;

guide means on the upper portion of said frame members that initiate compaction of said net within said gap;

and power means on said frame for rotating said sheave halves.

9. Apparatus as set forth in claim 8 wherein hinged connection means interconnect the central portion of said sheave halves.

10. Apparatus as set forth in claim 8 wherein power-operated means are interposed between said frame members to urge their lower ends towards and away from one another.

11. Apparatus as set forth in claim 9 wherein power-operated means are interposed between said frame members to urge their lower ends towards and away from one another.

12. Apparatus as set forth in claim 11 wherein said power-operated means comprise a fluid-operated cylinder and plunger unit.

* * * * *